(12) United States Patent
Jeffries (10) Patent No.: US 7,828,127 B2
(45) Date of Patent: Nov. 9, 2010

(54) ROTARY DAMPER

(75) Inventor: Mark Jeffries, Cumming, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 1139 days.

(21) Appl. No.: 11/250,588

(22) Filed: Oct. 14, 2005

(65) Prior Publication Data

US 2007/0084686 A1   Apr. 19, 2007

(51) Int. Cl.
    *F16F 9/14*   (2006.01)

(52) U.S. Cl. .................................. 188/307; 188/290

(58) Field of Classification Search ............ 16/52, 16/54; 188/290, 306, 307
See application file for complete search history.

(56) References Cited

U.S. PATENT DOCUMENTS

| | | | |
|---|---|---|---|
| 1,970,008 A | 8/1934 | Larson | |
| 4,609,081 A * | 9/1986 | Hungerford | 188/307 |
| 4,723,639 A | 2/1988 | Hungerford | |
| 4,756,051 A * | 7/1988 | Shy | 16/50 |
| 5,664,286 A * | 9/1997 | Sorimachi | 16/54 |
| 5,697,122 A | 12/1997 | Okabe et al. | |
| 6,035,454 A | 3/2000 | Birchall | |
| 6,393,624 B1 | 5/2002 | Iwashita | |
| 6,523,185 B1 * | 2/2003 | Moore et al. | 4/246.2 |
| 6,687,921 B1 | 2/2004 | Li | |

FOREIGN PATENT DOCUMENTS

JP   07063235 A  *  3/1995

* cited by examiner

*Primary Examiner*—Bradley T King
(74) *Attorney, Agent, or Firm*—Brian B. Diekhoff; Polsinelli Shughart PC (57) ABSTRACT

A rotary damper allows for fluid bypass through the interior of the hydraulic chamber, as opposed to dampers where fluid bypass occurs only along the walls of the hydraulic chamber. Additionally, the damper accommodates bi-directional damping, by providing a universal piece and switching the position of a component in the piece.

31 Claims, 5 Drawing Sheets

ROTARY DAMPER

TECHNICAL FIELD

The present invention relates to rotary dampers, and in particular, to rotary damping hinges for hinged structures.

BACKGROUND

Rotary dampers are commonly used with devices whose movement in one direction is sought to be controlled, typically by being slowed. For example, rotary dampers are used for door hinges, gate hinges, such as those in doors for pick-up truck beds, toilet seat hinges, piano key covers, and the like. These dampers are typically designed to be biased in a single rotational direction. Damping in this manner is commonly referred to as one-way or uni-directional damping.

This one-way damping facilitates strong damping in one rotational direction, such that movement of the object associated with the damper is slow and steady, avoiding any rapid, sudden or hard contacts, with surfaces, from rapid and uncontrolled movements. Accordingly, damping in the opposite rotational direction is minimal, allowing for rapid movement of the object associated with the damper.

This one-way biasing is a drawback should damping in the opposite direction be desired. Should some significant damping in the other direction be desired, the dampers must be made from two separate sets of molds and corresponding tooling. This is wasteful of time and materials.

SUMMARY OF THE INVENTION

The present invention overcomes the drawbacks associated with conventional rotary dampers, by providing a damper that allows for fluid bypass through the interior of the hydraulic chamber, as opposed to dampers where fluid bypass occurs only along the walls of the hydraulic chamber. Additionally, the present invention provides a single apparatus that accommodates bi-directional damping, by switching the position of a component in the apparatus. As a result, only a single piece, that forms the damping or hydraulic chamber, needs to be made, eliminating the duplicity in tooling molding and the like, required for rotary dampers that damp in different rotational directions.

An embodiment of the invention is directed to a rotary damper. The damper includes, a first piece, a second piece, a rotary member, and, a flexible member. The first piece includes a cylindrical portion including oppositely disposed ends and an inner wall, lateral portions at each of the oppositely disposed ends of the cylindrical portion, the lateral portions coupled with the cylindrical portion to define a chamber. The second piece is rotationally coupled to the first piece, and includes oppositely disposed portions corresponding to the oppositely disposed ends of the cylindrical portion. The rotary member extends in the chamber and is coupled to the second piece, the rotary member extending at least proximate to the inner wall and at least proximate to the lateral portions. The rotary member at least partially (when coupled with the flexible member) divides the chamber into a first area and a second area. A flexible member extends from a point at least proximate the inner wall, to at least proximate, and typically into contact with, the rotary member. The flexible member is for moving between open and closed positions, to provide an opening between the first area and the second area.

Anther embodiment of the invention is also directed to a rotary damper. The rotary damper includes, a first piece, lateral portions, a second piece, a rotary member, and, a flexible member. The first piece includes a cylindrical portion including oppositely disposed ends and an inner wall. There are lateral portions at each of the oppositely disposed ends of the cylindrical portion, the lateral portions coupled with the cylindrical portion to define a chamber, and each of the lateral portions includes a channel extending into the respective lateral portion. The second piece is rotatable with respect to the first piece and includes oppositely disposed portions corresponding to the oppositely disposed ends of the cylindrical portion. The rotary member extends in the chamber and is coupled to the second piece, with the rotary member extending at least proximate to the inner wall and at least proximate to the lateral portions. The rotary member at least partially (coupled with the flexible member) divides the chamber into a first area and a second area, and is such that the channels are closed when the rotary member is in a position beyond each channel, and that each channel is open when the rotary member moves over it. The flexible member extends from a point at least proximate to the inner wall to at least proximate the rotary member, and typically into contact therewith, the flexible member configured for moving to an open position, to provide an opening between the first area and the second area.

Another embodiment of the invention is directed to a rotary damper. The rotary damper includes, a chamber, a moveable member, and a flexible member. The chamber is for holding fluid, such as grease or other hydraulic fluid, is typically cylindrical and of a circular cross section, and includes at least one interior wall and oppositely disposed lateral walls. The movable member is rotatably mounted in the interior of the chamber, with the mounting such that the moveable member is in frictional contact with the at least one interior wall and the oppositely disposed lateral walls. The flexible member is in a cooperative arrangement with the moveable member, and the flexible member extends from at least proximate the at least one inner wall into operative communication with the moveable member, to divide the chamber into a first area and a second area. The flexible member is biased so as to be moveable in a first direction to allow for fluid bypass through the interior of the chamber upon rotation of the moveable member.

Another embodiment of the invention is further directed to a rotary damper. The rotary damper includes a chamber, a moveable member and a flexible member. The chamber includes at least one interior wall and oppositely disposed lateral walls. It is designed for holding fluid, and at least one of the oppositely disposed lateral walls includes a channel for fluid transport extending into the at least one lateral wall. The moveable member is rotatably mounted in the chamber, and in frictional contact with the at least one interior wall and the oppositely disposed lateral walls. The movable member is disposed such that when beyond the channel, the channel is closed, and when moved along the channel, the channel is open, to allow for fluid bypass along the sides or walls of the chamber. The flexible member is cooperatively arranged with respect to the moveable member, and it extends from at least proximate the at least one inner wall, typically into contact with the moveable member, to divide the chamber into a first area and a second area. The flexible member is biased so as to be moveable in a first direction to allow for fluid bypass through the interior of the chamber upon rotation of the moveable member.

Another embodiment of the invention is directed to a rotary damper member for supporting bi-directional damping. The member includes, a cylindrical portion including at least one interior wall, and defining an interior chamber, and, a finger extending from the interior wall into the chamber, the finger extending at least substantially the length of the cylindrical portion. There is also a first stub and a second stub, disposed on opposite sides of the finger, with the first stub and the second stub extending at least substantially the length of the cylindrical portion. The first stub and the second stub are positioned from the finger, to define a first slot and a second slot, each slot capable for receiving and retaining a flexible member, depending on the directionality of the damping desired.

BRIEF DESCRIPTION OF THE DRAWINGS

Attention is now directed to the drawing figures, where like numerals or characters indicate corresponding or like components. In the drawings.

DETAILED DESCRIPTION

The present invention is directed to a rotary damper, that damps by providing for fluid bypass along the walls of an internal hydraulic or other fluid filled chamber, as well as through the interior of the chamber. The present invention is also directed to a universal member for bi-directional damping, that accommodates damping in the desired direction, based on the placement of a flexible member in interior of the universal member.

Figure 1:
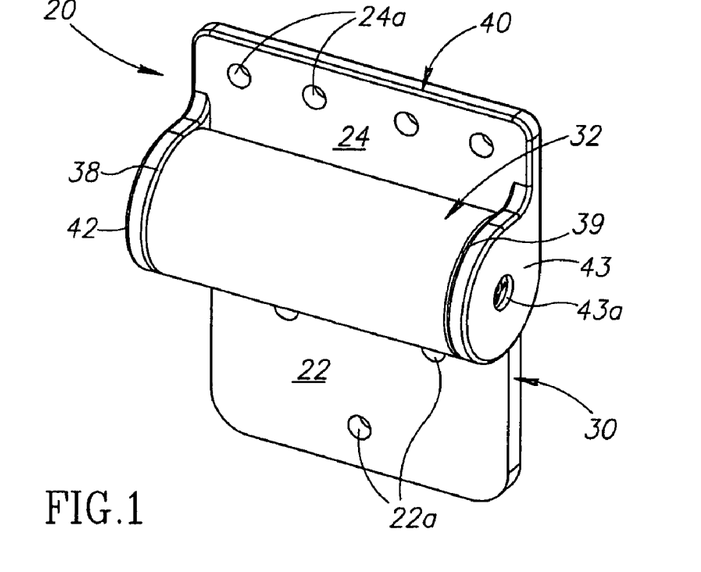
FIG. 1 is a perspective view of the apparatus in accordance with an embodiment of the invention in a first position.
Figure 2:
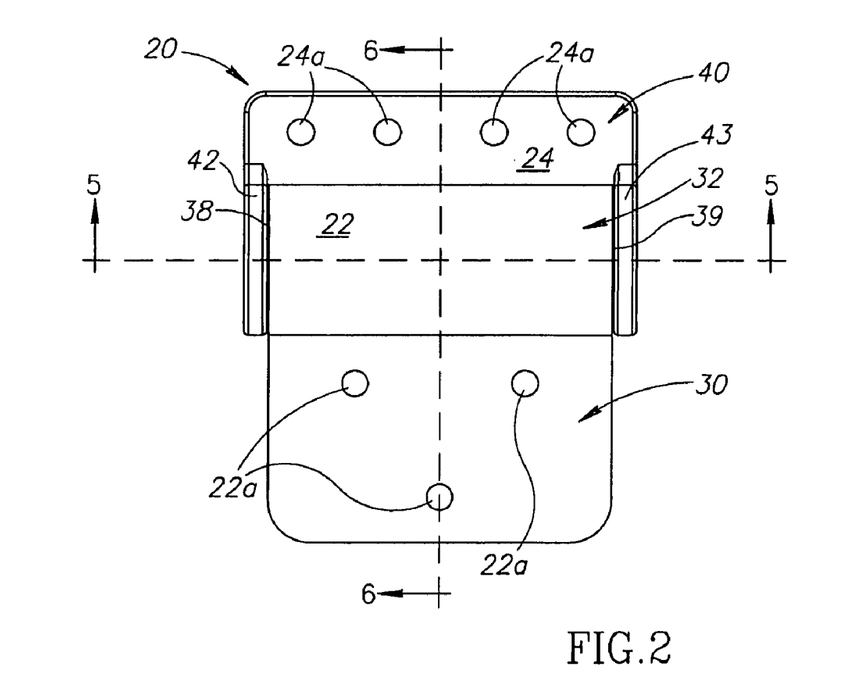
FIG. 2 is a top view of the apparatus of FIG. 1.
Figure 3:
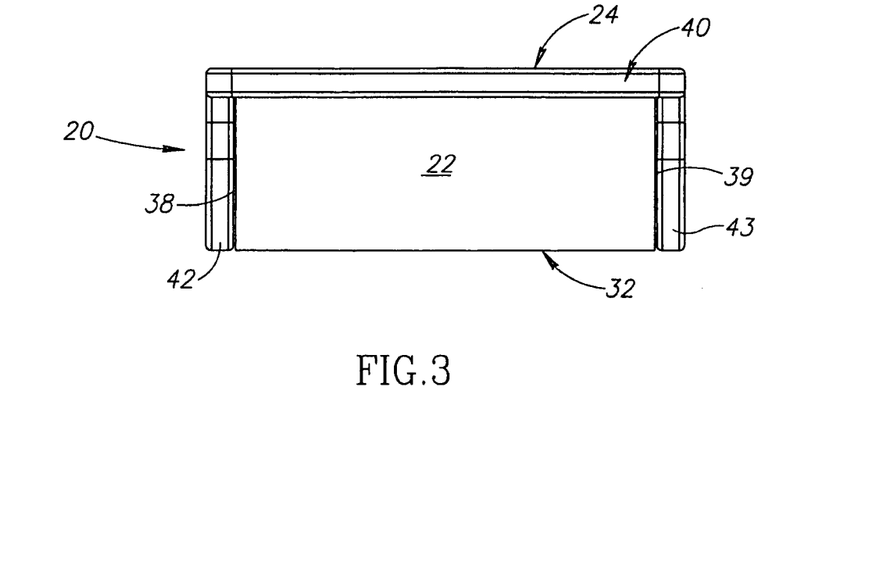
FIG. 3 is a rear view of the apparatus of FIG. 1.
Figure 4:
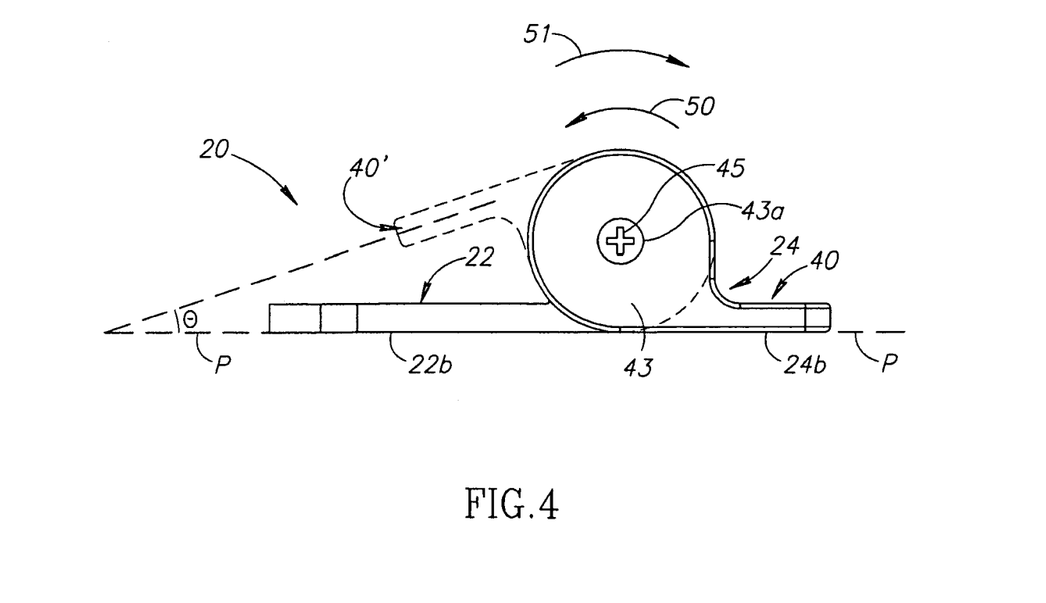
FIG. 4 is a side view showing the apparatus of FIG. 1 in an exemplary rotation, to a second position.

FIGS. 1-3 show the apparatus 20 of the invention in a first or extended position, while FIG. 4 shows the apparatus 20 of the invention in a second or rotated position. The apparatus 20 is a rotary damper, for example, a hinge, typically formed of a first piece 22, attached to a second piece 24. This rotational attachment allows the rotation of either of the pieces 22, 24 with respect to the other piece. These pieces 22, 24 are typically made of metal, plastic, or other non-porous materials. Both pieces 22, 24 may include openings 22a, 24a, to accommodate, screws, nails, joints or other fasteners, or the like, allowing the apparatus to be attached or joined to various objects.

Figure 6:
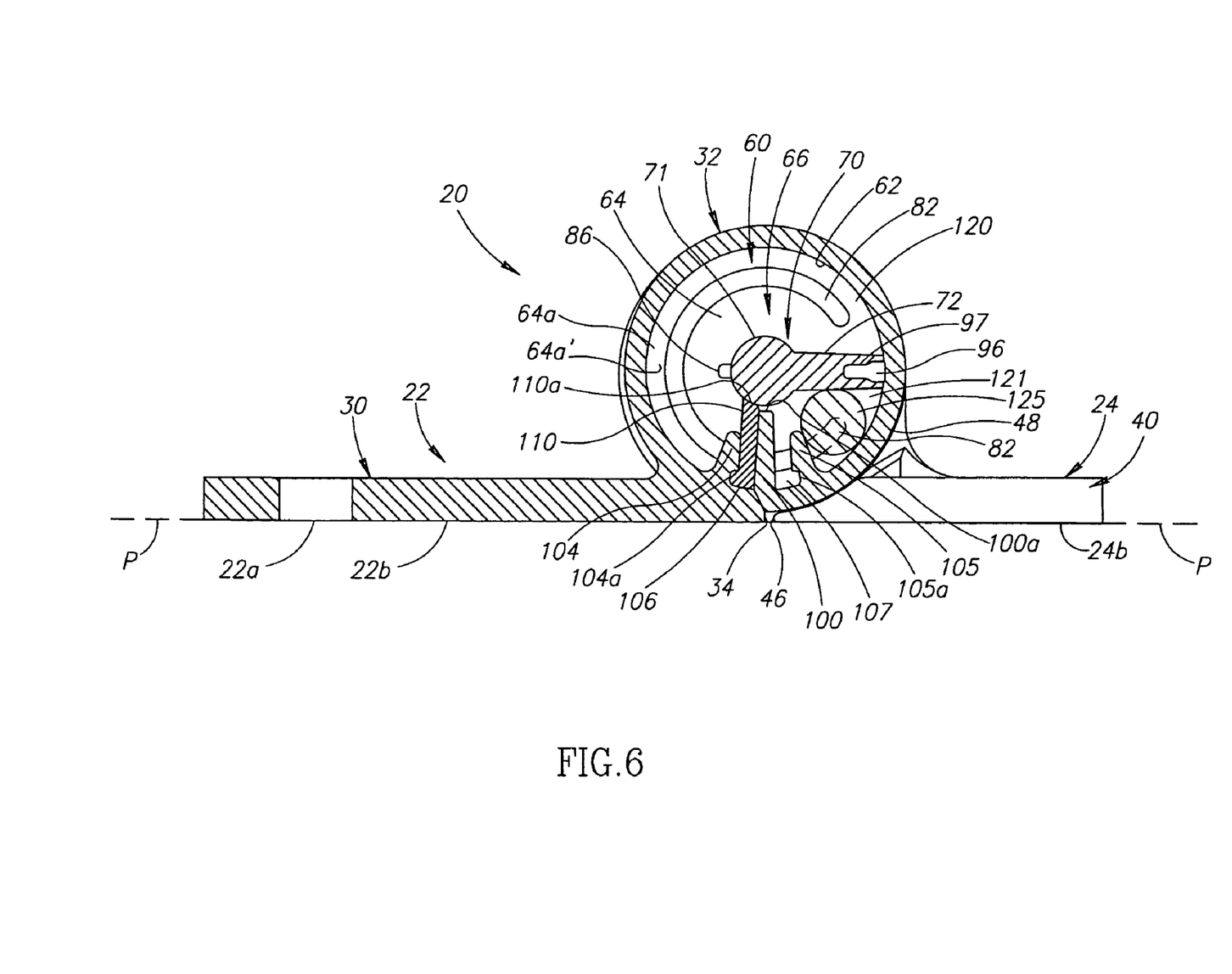
FIG. 6 is a cross section of the apparatus of FIG. 2 taken along line 6-6.

The first piece 22 includes a flat portion 30 and a cylindrical portion 32. The flat portion 30 terminates in an end 34, that extends under the cylindrical portion 32, typically to a distance corresponding to at least approximately the mid-point of the circular cross-section of the cylindrical portion 32 (as shown in FIG. 6). The cylindrical portion 32 includes oppositely disposed open ends 38, 39.

Figure 5:
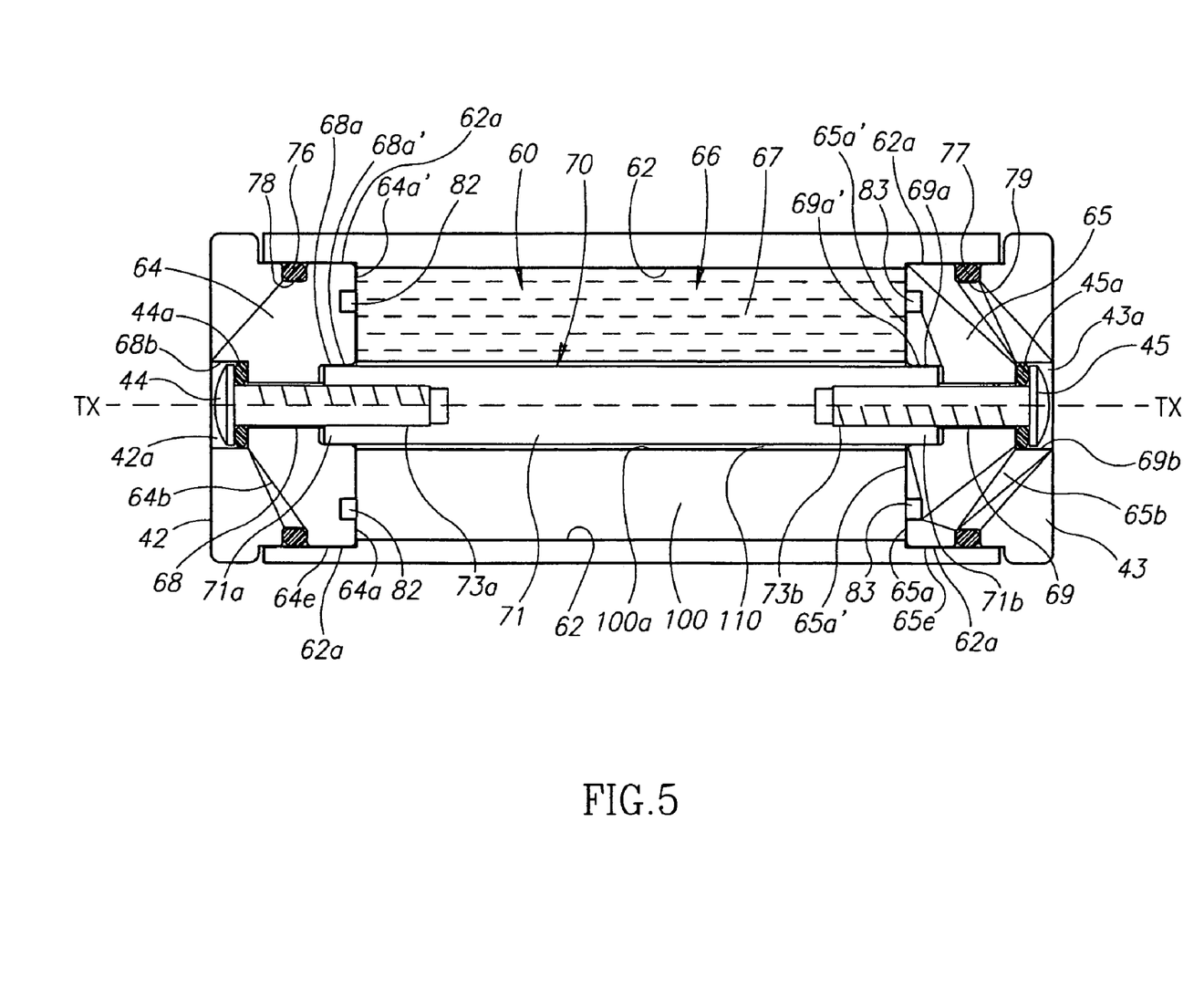
FIG. 5 is a cross section of the apparatus of FIG. 2, taken along line 5-5.

The second piece 24 includes a flat portion 40, with flanges 42, 43, that fit over the respective open ends 38, 39 of the cylindrical portion 32. The flanges 42, 43 are typically shaped to cover the open ends 38, 39 of the cylindrical portion 32. The flanges 42, 43 include openings 42a (FIG. 5), 43a, that accommodate screws 44 (FIG. 5), 45 that are received in a central member 70 in the respective bores 73a, 73b (the screws 44, 45 and central member 70 defining a transverse axis TX extending through the cylindrical portion 32, as shown in FIG. 5 and detailed below), allowing for rotation of the pieces 22, 24 with respect to each other, between the first position (FIGS. 1-3) and the second position (FIG. 4), and all positions therebetween. The second piece 24 is connected to the central member 70, via the screws 44, 45, whereby rotation of the second piece 24, rotates the central member 70.

The flat portion 40 terminates 30 in an end 46 (FIG. 6), that extends under the cylindrical portion 32, typically to a distance proximate to the mid-point of the circular cross-section of the cylindrical portion 32, and a curved portion 48 (FIG. 6). The curved portion 48 is of a radius of curvature slightly larger than the radius of curvature of the cylindrical portion 32, allowing the second piece 24 to move over the cylindrical portion 32 of the first piece 22, without obstruction.

The ends 34, 46, are in close proximity to each other (typically with a gap therebetween), typically allowing for the surface 22b of the first piece 22 and the surface 24b of the second piece 24 to be flush, as both pieces 22, 24 are along a plane P (FIGS. 4 and 6). The positioning of these ends 34, 46 typically allows for a small amount of over rotation of both pieces 22, 24 (for example, approximately 2-3 degrees), and this positioning serves to limit travel for both pieces 22, 24 (as the ends 34, 46 may abut if over rotated). This arrangement, of the pieces 22, 24 and the gap between their respective ends 34, 46, also allows for manufacturing variations.

For example, as shown in FIG. 4, the second piece 24, at the flat portion 40, has been rotated (for example, counterclockwise) with respect to the first piece 22, in the direction of the arrow 50, for example, to a position shown by the broken line flat portion 40', and indicated by the angle θ, that may be, for example, approximately 22 degrees. The second piece 24 can be returned to the first or flat position by being rotated (for example, clockwise) in the direction of the arrow 51.

Turning also to FIGS. 5 and 6, the interior 60 of the cylindrical portion 32 is shown in detail. The interior 60 is formed by the inner walls 62 of the cylindrical portion 32. The interior 60, at the inner walls 62, is typically of a constant diameter (cross-sectional diameter) and accordingly, of a circular cross section in shape. End caps 64, 65 are received in cut outs 62a of the inner walls 62 in a frictionally snug and fixed engagement. The end caps 64, 65 may be further secured to the inner walls 62 (in the cut outs 62a) by adhesives, mechanical fasteners, corresponding protrusions and indents, and the like. The end caps 64, 65 are in a rotational relationship with the flanges 42, 43, and central member 70, such that the end caps 64, 65 remain stationary, when either, or both of the first 22 or second 24 pieces are moved. Coupled with the end caps 64, 65, the inner walls 62 of the interior 60, form a chamber 66, that is typically filled with grease or other fluid 67 (shown in broken lines), allowing the apparatus 20 to hydraulically damp. The inner sides 64a, 65a of the end caps 64, 65 define the sides or side walls of the chamber 66, while the space between the inner sides 64a, 65a of the end caps 64, 65 and the inner wall 62 defines the interior of the chamber 66.

The end caps 64, 65, include bores 68, 69, through their centers, through which the screws 44, 45 extend. Each of the bores 68, 69 extends from an indent 68a, 69a, in the inner side 64a, 65a of each end cap 64, 65, to an indent 68b, 69b in the outer side 64b, 65b (typically cylindrical) of each end cap 64, 65.

The screws 44, 45, push against O-rings 44a, 45a, as the screws 44, 45 and O-ring 44a, 45a seat in the indents 68b, 69b in the outer sides 64b, 65b of the end caps 64, 65. The O-Rings 44a, 45a are formed of elastomers or other resilient materials, and seal the end caps 64, 65, keeping fluid in the chamber 66.

The end caps 64, 65 are fixed in their position and contact a central member 70 (or rotary member), at its head 71, at the respective ends 71a, 71b. The ends 71a, 71b of the head 71 seat in the indents 68a, 69a of the inner sides 64a, 65a of the end caps 64, 65 in a rotational engagement. A tail 72 extends outward from the head 71 of the central member 70. The head 71 of the central member extends beyond the tail 72 of the central member 70, and the tail 72 extends (along the transverse axis TX) to the surfaces 64a', 65a' of the inner 64a, 65a, and into an abutting contact with the respective surfaces 64a', 65a' of the end caps 64, 65.

The receipt is such that the openings 42a, 43a in the flanges 42, 43, align with the bores 68, 69 in the end caps and bores 73a, 73b in the central member 70, to receive the respective screws 44, 45. This receipt, coupled with the wiping or frictional contact of the tail 72 of the central member 70, with the respective end caps 64, 65, allows for rotation (movement) of the central member 70, when the second piece 24 is rotated with respect to the first piece 22, and vice versa (for example, as shown in FIG. 4, and described herein). During this rotation of the central member 70, the end caps 64, 65 remain stationary.

The O-rings 76, 77, formed of elastomers or other resilient materials, seat in circumferential slots 78, 79, respectively, on the outer sides 64b, 65b of the end caps 64, 65, to facilitate rotation of the first piece 22 and the second piece 24, with respect to each other, and serving as a seal, to keep fluid, for example, grease (functioning as a hydraulic fluid, e.g., Class 3 vacuum grease), oil (e.g., 90 weight motor oil) or other hydraulic fluid within the interior 60 (the chamber 66) of the cylindrical portion 32.

Figure 7:
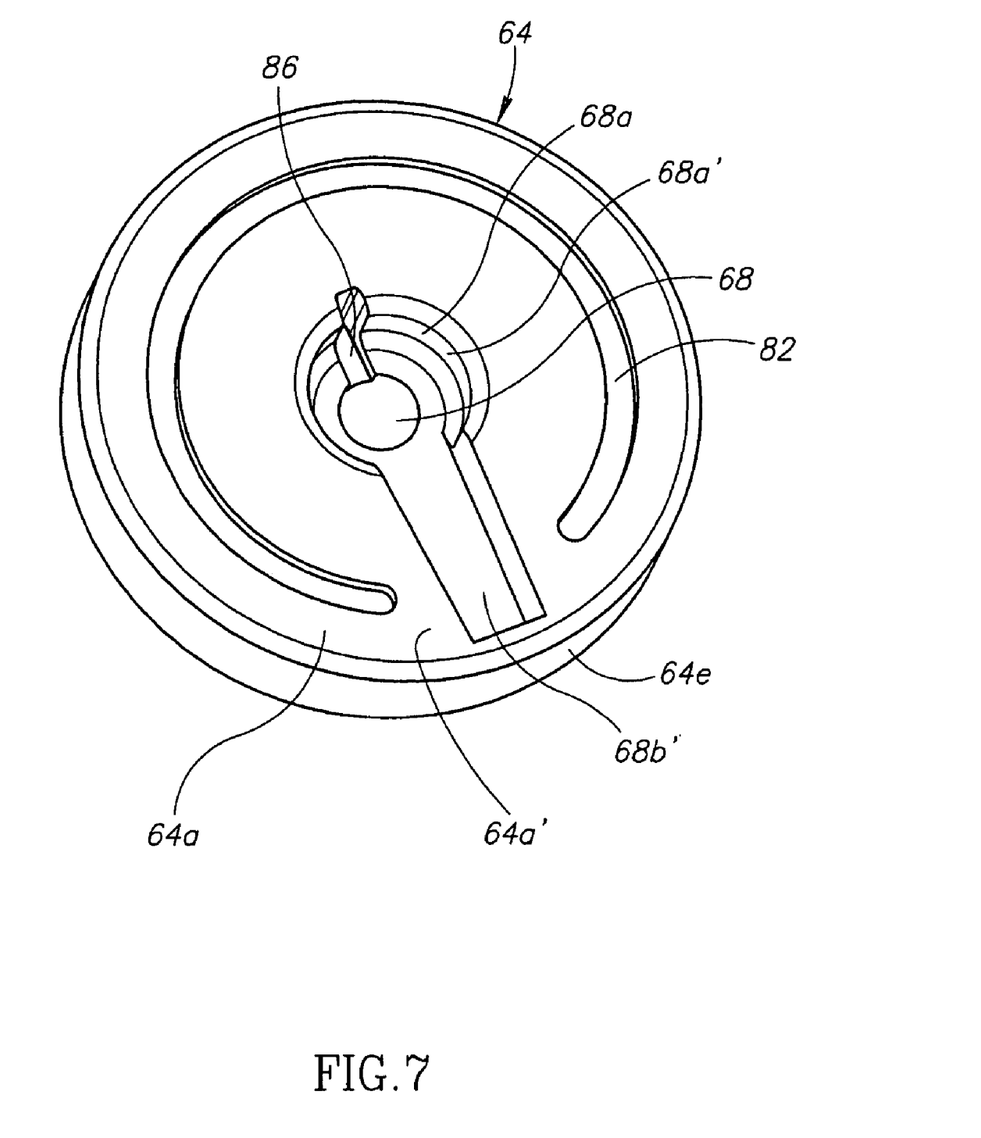
FIG. 7 is a front perspective view of the inner side of an end cap of the apparatus.

Turning also to FIG. 7, channels or metering paths 82, 83 extend into the inner sides 64a, 65a, of the end caps 64, 65, and these channels or metering paths 82, 83 are typically symmetric. (A portion of the channel 82 is shown in broken lines in FIG. 6). The channels or metering paths 82, 83 facilitate the flow of fluid, also known as fluid bypass, along the sides (side walls) of the chamber 66, and around the central member 70, upon rotation of one or both of the pieces 22, 24. The channels or metering paths 82, 83 are typically "C" shaped (typically, the "C" shape is symmetric), extend as arcs or arc-like into the respective inner sides 64a, 65a, and typically originate at a point beyond (above) the tail 72 of the central member 70, so as to be opened for fluid bypass around the central member 70, when the central member 70 is moved (by movement of the second piece 24 or if the first piece 22 is moved, or combinations thereof) so as to be along the channels or metering paths 82, 83.

In each inner side 64a, 65a of each end cap 64, 65 is a canal 86, that is typically "L-shaped" (only one shown). This canal 86 (only one shown) extends along the indent 68a, from the bore 68 to the surface 64a', 65a' of the inner side 64a, 65a. Each indent 68a, 69a includes a rounded portion 68a', 69a', for receiving the ends 71a, 71b of head 71 of the central member 70 in a rotatable engagement, and, a tail portion 68b' (only one shown), corresponding to the shape of the tail 72 of the central member 70, extending radially outward, to a point proximate to the edge 64e, 65e of the end cap 64, 65. The tail indent 68b' holds fluid, allowing for a smooth wiping contact of the tail 72 (at its ends) of the central member 70 against the surfaces 64a', 65a' of the inner sides 64a, 65a of the end caps 64, 65.

The canal 86 in indented, so as to extend beyond the head 71 of the central member. This canal 86 allows for fluid bypass over the central member 70, when the apparatus 20 is being assembled and the interior 60 (chamber 66) is being filled with fluid. Once the screws 44, 45 have been attached, and the O-rings 44a, 45a, seal the end caps 64, 65, the canal 86 is no longer used for fluid bypass.

While the end cap 64 at its inner side 64a has been described and shown in FIG. 7, the inner side 65a of the end cap 65 is symmetric. Accordingly, the description for the inner side 64a of the end cap 64 is equally applicable to the inner side 65a and its surface 65a' of the opposite end cap 65.

The central member 70, is typically of a "key" shaped cross section. It includes the head 71, that is rounded, for positioning centrally in the interior 60 (this head 71 includes the bores 73a, 73b), with the tail 72, extending from the head 71, radially outward, toward the inner wall 62 of the cylindrical portion 32. A contact piece 96, typically of a flexible material such as an elastomer or the like, is typically frictionally fitted into a slot 97 at the outer end of the tail 72. The contact piece 96 typically is dimensioned for maintaining contact, with the inner wall 62 of the cylindrical portion 32, typically by a wiping action or other frictional type contact, as the central member 70 rotates in the chamber 66 (interior 60).

A finger 100, extends from the inner wall 62, to an edge 100a, and is aligned with the head 71 of the central member 70. Stubs 104, 105 also protrude from the inner wall 62, and are typically spaced equidistant from the finger 100. The spacing between the finger 100, and the respective stubs 104, 105 creates slots 106, 107, that are typically L-shaped and symmetric, due to the indentations 104a, 105a in the stubs 104, 105, and the equidistant positioning of the stubs 104, 105 with respect to the finger 100.

A flexible member 110, is designed to seat in either of the slots 106, 107, depending on the desired biasing of the apparatus 20. The flexible member 110, terminates in a tip 110a, at a point at least proximate to the head 71 of the central member 70, and is typically in contact with the head 71 of the central member 70. For example, as shown here, the flexible member 110 is seated in the slot 106. The stubs 104, 105, are typically of a lower elevation than the finger 100, in order to facilitate bending of the flexible member 110 during fluid bypass, in the direction of the stubs 104, 105, in a damping operation, one such operation with bending toward the stub 104 detailed below.

The flexible member 110 is typically L-shaped and universally sized, to seat in either of the slots 106, 107, and as shown in FIG. 6, remains locked in position, as a portion of the flexible member 110 remains anchored in the indentation 104a, of the stub 104. (If the apparatus was configured oppositely, for damping in the opposite direction, the flexible member 110 would remain anchored in the indentation 105a, of the stub 105).

The flexible member 110 is typically of a material, such as an elastomer, that is resilient, yet allows for bending and flexing. Moreover, as a result of the slots 106, 107 being symmetric, coupled with the universal sizing of the flexible member 110, the flexible member 110 can be fitted into either of the slots 106, 107. Accordingly, only a single piece 22 needs to be manufactured (machined and tooled), as it can facilitate damping in any desired rotational direction (for example, clockwise or counterclockwise). Accordingly, with the flexible member 110 in the desired slot 107, damping is in the opposite direction, to that shown in FIGS. 5 and 6.

The finger 100, stubs 104, 105 (and corresponding indents 104a, 105a), slots 106, 107 and flexible member 110, are designed to extend in the interior 60 of the cylindrical portion 32 (transversely, in the direction of the transverse axis TX), between the end caps 64, 65.

The central member 70, coupled with the finger 100 and flexible member 110, divides the chamber 66 into areas 120, 121. For example, in the arrangement of components as shown in FIGS. 5 and 6, there are two areas, a high-pressure area 120 and a low-pressure area 121.

There may also be a volume compensator 125, that, as shown, seats in the low-pressure area 121. The volume compensator 125 is, for example, a solid or fluid filled member that extends at least approximately the length of the chamber 66 (transversely, in the direction of the transverse axis TX, between the end caps 64, 65).

Exemplary operations will now be detailed with reference to FIGS. 1-7. For example purposes, the flexible member 110 is in the slot 106, as shown in FIG. 6.

When the second piece 24 is rotated counterclockwise (in the direction of the arrow 50 of FIG. 4), from the first or flat position to the second or rotated position shown in FIG. 4, rotation to the position (orientation), as shown in FIG. 4, is slow. The counterclockwise moving central member 70 causes high damping forces, resulting from grease flowing mainly through the metering paths 82, 83 absent any bypass through the interior of the chamber 66.

This is because there is not any flow, or an extremely limited flow of fluid between the head 71 of the central member 70 and the flexible member 110, as the flexible member 110, due to its biasing, is forced against the finger 100. This biasing results in a slight, if any, opening between the tip 110a of the flexible member 110 and the head 71 of the central member 70. Accordingly, absent any significant opening through the interior of the chamber 66, fluid flow between the low pressure area 121 and the high pressure area 120 (through the opening between the edge 100a of the finger 100 and the head 71 of the central member 70), is slow, resulting in slow and typically controlled and regulated damping, upon the counterclockwise rotation of the second piece 24 (and accordingly, the central member 70), with respect to the first piece 22.

When the second piece 24 is rotated clockwise, in the direction of the arrow 51, from second or rotated position to the first or flat position, as shown in FIGS. 1-3, rotation is faster due to lower damping forces. This is because the clockwise moving central member 70 causes fluid flow through the channels or metering paths 82, 83, as well as through an opening between the flexible member 110 (at the tip 110a of the flexible member 110) and the finger 100 (at the edge 100a of the finger 100), and the head 71 of the central member 70. The biasing of the flexible member 110, results in its flexing or bending over the stub 104, creating the aforementioned opening for fluid flow. This allows for rapid fluid flow or fluid bypass into the low-pressure area 121, from the high-pressure area 120, aforementioned opening, through the interior of the chamber 66 in addition to through the channels or metering paths 82, 83. Damping, and movement of the pieces 22, 24 to the original position is faster in the clockwise direction, when compared to the counterclockwise direction, as detailed above.

In the orientation shown, and when the fluid that fills the chamber 66 is, grease or oil, as detailed above, or any other fluid of a viscosity to function as hydraulic fluid (also as detailed above), there are pressure differentials between the high-pressure area 120 and the low-pressure area 121. Pressure differentials may be as great as 1500 pounds per square inch (psi).

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A rotary damper comprising:
   a first piece including a cylindrical portion including oppositely disposed ends and an inner wall;
   lateral portions at each of the oppositely disposed ends of the cylindrical portion, the lateral portions coupled with the cylindrical portion to define a chamber;
   a second piece rotatably coupled to the first piece and including oppositely disposed portions corresponding to the oppositely disposed ends of the cylindrical portion;
   a rotary member extending in the chamber and operatively coupled to the second piece, the rotary member extending at least proximate to the inner wall and at least proximate to the lateral portions, the rotary member configured for at least partially dividing the chamber into a first area and a second area;
   a finger extending from the inner wall into the chamber, the finger extending at least substantially the length of the cylindrical portion;
   a first stub and a second stub disposed on opposite sides of the finger, the first stub and the second stub extending at least substantially the length of the cylindrical portion, and the first stub and the second stub positioned from the finger to define a first slot and a second slot in the inner wall for receiving and retaining a flexible member, wherein the flexible member biases against either side of the finger during damping of the rotary damper; and,
   the flexible member mounted in the first slot or the second slot of the inner wall of the cylindrical portion to determine a direction of damping, the flexible member extending from the inner wall to at least proximate the rotary member, the flexible member configured for moving to an open position, to provide an opening between the first area and the second area.

2. The rotary damper of claim 1, wherein the rotary member includes a head portion and a tail portion, the tail portion extending toward the inner wall from the head portion, and, the head portion extends transversely through the center of the chamber and is axially mounted to oppositely disposed portions of the second piece.

3. The rotary damper of claim 1, wherein the flexible member is mounted in the inner wall of the cylindrical portion in a biased manner, such that the flexible member moves to the open position in one direction, and the flexible member moves to a closed position in another direction, wherein the flexible member is forced against the finger.

4. The rotary damper of claim 2, wherein the rotary member extends into moveable contact with the inner wall and extends into movable contact with the lateral portions.

5. The rotary damper of claim 2, wherein each of the lateral portions includes channels extending into each of the lateral portions.

6. The rotary damper of claim 5, wherein each of the channels are arc-like in shape, and at least substantially symmetric in each of the lateral portions.

7. The rotary damper of claim 6, wherein each of the channels are arranged such that they are opened when the rotary member is moved over the channels and closed when the rotary member is moved beyond each of the channels.

8. The rotary damper of claim 5, wherein the chamber supports hydraulic fluid, such that the rotary damper operates hydraulically, with damping forces greater in a first direction than in a second direction, wherein the hydraulic fluid passes through the channels and in between the flexible member and the rotary member in the second direction.

9. The rotary damper of claim 1, wherein the cylindrical portion is of a rounded cross section and the inner wall is of a constant diameter.

10. A rotary damper comprising:
    a first piece including a cylindrical portion including oppositely disposed ends and an inner wall, a finger extending from the inner wall, a first stub and a second stub extending from the inner wall, the first and second stub disposed on opposite sides of the finger, the first stub and the second stub extending at least substantially the length of the cylindrical portion, and the first stub and the second stub positioned from the finger to define a first slot and a second slot in the inner wall for receiving and retaining a flexible member, wherein the finger extends a greater height than the first stub and the second stub, wherein the flexible member biases against the finger during damping of the rotary damper;

lateral portions at each of the oppositely disposed ends of the cylindrical portion, the lateral portions coupled with the cylindrical portion to define a chamber, at least one of the lateral portions including a channel extending into the at least one lateral portion;

a second piece rotatably coupled to the first piece and including oppositely disposed portions corresponding to the oppositely disposed ends of the cylindrical portion;

a rotary member extending in the chamber and operatively coupled to the second piece, the rotary member extending at least proximate to the inner wall and at least proximate to the lateral portions, the rotary member configured for at least partially dividing the chamber into a first area and a second area, and configured such that the at least one channel is closed when the rotary member is in a position beyond the at least one channel, and the at least one channel is open when the rotary member moves over the at least one channel; and, the flexible member mounted in first slot or the second slot of the inner wall of the cylindrical portion, the flexible member extending from the inner wall to at least proximate the rotary member and contacting the rotary member, the flexible member configured for moving to an open position, to provide an opening between the flexible member and the rotary member and between the first area and the second area.

11. The rotary damper of claim 10, wherein each of lateral portions include a channel extending into each of the lateral portions.

12. The rotary damper of claim 11, wherein each of the channels are arc-like in shape and at least substantially symmetric in each of the lateral portions.

13. The rotary damper of claim 11, wherein the rotary member includes a head portion and a tail portion, the tail portion extending toward the inner wall from the head portion, and, the head portion extends transversely through the center of the chamber and is axially mounted to oppositely disposed portions of the second piece.

14. The rotary damper of claim 13, wherein the flexible member is mounted in the inner wall of the cylindrical portion in a biased manner, such that the flexible member moves to the open position in one direction and the flexible member moves to a closed position in another direction, wherein the flexible member is forced against the finger.

15. The rotary damper of claim 14, wherein rotary member extends into moveable contact with the inner wall and extends into movable contact with the lateral portions.

16. The rotary damper of claim 10, wherein the chamber supports hydraulic fluid, such that the rotary damper operates hydraulically, with damping forces greater in a first direction than in a second direction, wherein the hydraulic fluid does not flow between the rotary member and the flexible member in the first direction.

17. The rotary damper of claim 10, wherein the cylindrical portion is of a rounded cross section and the inner wall is of a constant diameter.

18. A rotary damper comprising:
a chamber including at least one interior wall and oppositely disposed lateral walls, the chamber configured for holding fluid;
a moveable member rotatably mounted in the chamber, the moveable member in frictional contact with the at least one interior wall and the oppositely disposed lateral walls; and,
a finger extending from the at least one interior wall;
a first stub and a second stub disposed on opposite sides of the finger, the first stub and the second stub positioned from the finger to define a first slot and a second slot in the at least one interior wall for receiving and retaining a flexible member, wherein the flexible member biases against either side of the finger during damping of the rotary damper;
the flexible member in operative communication with the moveable member, the flexible member seated in one of the slots, the flexible member extending from the at least one interior wall into operative communication with the moveable member, to divide the chamber into a first area and a second area, the flexible member biased so as to be moveable in a first direction to allow for fluid bypass through the interior of the chamber upon rotation of the moveable member, the flexible member biased so as to be moveable in a second direction, wherein the flexible member is forced against the finger to not allow flow between the flexible member and the moveable member upon rotation of the moveable member.

19. The rotary damper of claim 18, wherein the moveable member is axially mounted in the chamber.

20. The rotary damper of claim 19, wherein each of the lateral walls includes at least substantially symmetric channels extending into each of the lateral walls, the channels arranged to be closed when the movable member is beyond the channels and opened when the moveable member is along the channels, the opened channels providing fluid bypass along the chamber exterior.

21. The rotary damper of claim 18, wherein the chamber is cylindrical, of a rounded cross section, and, of a constant diameter.

22. A rotary damper comprising:
a cylindrical portion, the cylindrical portion and defining a chamber in an interior of the cylindrical portion;
the chamber including at least one interior wall and oppositely disposed lateral walls, the chamber configured for holding fluid, at least one of the oppositely disposed lateral walls including a channel for fluid transport extending into the at least one lateral wall;
a moveable member rotatably mounted in the chamber, the moveable member in frictional contact with the at least one interior wall and the oppositely disposed lateral walls, the movable member disposed such that when beyond the channel, the channel is closed and when moved along the channel, the channel is open to allow for fluid bypass along the sides of the chamber; and,
a flexible member in operative communication with the moveable member, the flexible member mounted in the interior wall, the flexible member extending from the interior wall into operative communication with the moveable member, to divide the chamber into a first area and a second area, the flexible member biased so as to be moveable in a first direction to allow for fluid bypass through the interior of the chamber upon rotation of the moveable member;

a finger extending from the interior wall into the chamber, the finger extending at least substantially the length of the cylindrical portion; and a first stub and a second stub disposed on opposite sides of the finger, the first stub and the second stub extending at least substantially the length of the cylindrical portion, and the first stub and the second stub positioned from the finger to define a first slot and a second slot in the interior wall for receiving and retaining the flexible member, wherein the flexible member biases against either side of the finger during damping of the rotary damper.

23. The rotary damper of claim 22, wherein the moveable member is axially mounted in the chamber.

24. The rotary damper of claim 22, wherein at least one lateral wall including a channel includes the oppositely lateral walls, each having a channel, each of the channels positioned at least substantially symmetric with respect to each other.

25. The rotary damper of claim 24, wherein each of the channels are arc-like in shape.

26. The rotary damper of claim 22, wherein the chamber is cylindrical, of a rounded cross section, and, of a constant diameter.

27. A rotary damper member for supporting bi-directional damping comprising:

a cylindrical portion including at least one interior wall, and defining a chamber in the interior of the cylindrical portion within that at least one interior wall;

a finger extending from the interior wall into the chamber, the finger extending at least substantially the length of the cylindrical portion;

a flexible member, and, a first stub and a second stub extending from the interior wall, the first and second stub disposed on opposite sides of the finger, the first stub and the second stub extending at least substantially the length of the cylindrical portion, and the first stub and the second stub positioned from the finger to define a first slot and a second slot in the interior wall for receiving and retaining the flexible member, wherein the finger extends a greater height than the first stub and the second stub, wherein the flexible member biases against the finger during damping of the rotary damper.

28. The rotary damper of claim 27, wherein the first stub and the second stub are at least approximately equal in height.

29. The rotary damper of claim 28, wherein the first slot between the first stub and the finger and the second slot between the second stub and the finger are symmetric.

30. The rotary damper of claim 29, wherein the first slot between the first stub and the finger and the second slot between the second stub and the finger are L-shaped.

31. The rotary damper of claim 29, additionally comprising: the flexible member in either the first slot or the second slot and removable from the first slot or the second slot.

* * * * *